May 8, 1923.
P. McCUAIG
1,454,446
MATCH SCRATCHER
Original Filed Nov. 7, 1919
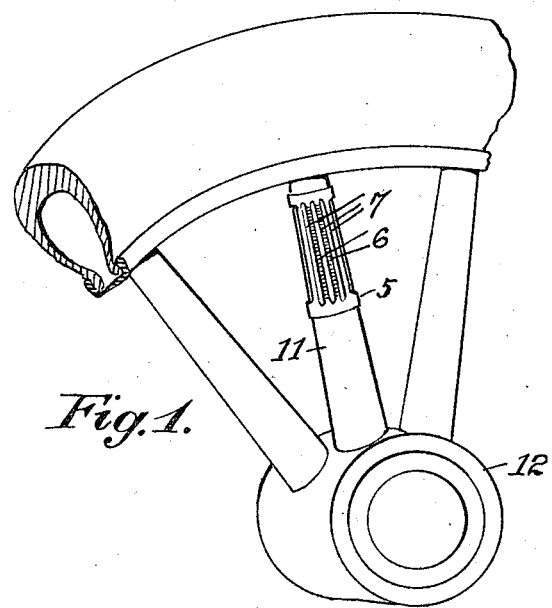
Fig.1.
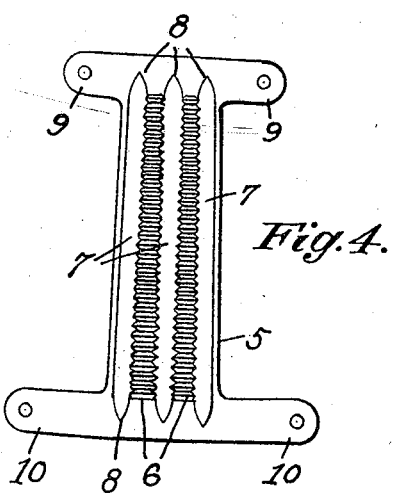
Fig.2.
Fig.4.
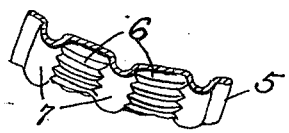
Fig.3.
INVENTOR
Peter McCuaig
BY
ATTORNEY Patented May 8, 1923.

1,454,446

UNITED STATES PATENT OFFICE.

PETER McCUAIG, OF FORT WILLIAM, ONTARIO, CANADA.

MATCH SCRATCHER.

Application filed November 7, 1919, Serial No. 336,500. Renewed October 21, 1922. Serial No. 596,167.

*To all whom it may concern:*

Be it known that I, PETER McCUAIG, a subject of the King of Great Britain, and a resident of Fort William, in the Province of Ontario and Dominion of Canada, have invented certain new and useful Improvements in Match Scratchers, of which the following is a specification.

This invention relates to match scratchers, and it is the object of the invention to provide a match scratcher which is novel and cheap in construction and efficient in use, and which may be removably attached to a support.

With the foregoing object in view I have shown an embodiment in the drawing accompanying and forming a part of this specification in which Figure 1 is a perspective view of a portion of a vehicle wheel showing my invention applied to the spoke of the wheel.

Figure 2 is an enlarged cross sectional view of a spoke of a vehicle wheel with my invention applied thereto to show the manner of removably attaching the same.

Figure 3 is a cross sectional view, in perspective, of the match scratcher to illustrate the arrangement of the match scratching surface and beads or ribs to guide a match along said surface; and Figure 4 is a plan view of my improved match scratcher.

Similar characters of reference designate like parts throughout the different views of the drawing.

In carrying out the invention I provide a sheet 5 of suitable metallic material, such as aluminum, and arrange said plate with a series of ridges to extend longitudinally of the plate upon which to scratch a match to ignite the same, and preferably consisting of rows of corrugations 6, shown in the present instance as two in number. At opposite ends and between adjacent rows of corrugations, and to extend beyond the rows of corrugations, the material of the plate is beaded or ribbed, as shown at 7, these beads being arranged to extend somewhat above the corrugations or ribs, as clearly shown in Figures 2 and 3, to serve as guides to maintain a match upon the corrugated portion of the plate during the operation of igniting the match. To further facilitate the guiding of a match upon the corrugated or ridged surface the ends of the ribs are rounded and reduced in width to come to a point or apex, as shown at 18.

To removably secure the scratcher to a support the plate is provided with laterally extending ears or lugs, these lugs being preferably arranged to extend from opposite sides and at opposite ends of the plate, as shown at 9 and 10, and being perforated for the engagement of means to secure the scratcher to a support.

In the drawing I have shown the invention as particularly adapted for application to the spoke 11 of a vehicle wheel 12, although it will be obvious that it may be attached to other supports. The material of which the scratcher is made is of a thickness and nature to be readily pliable, and to apply the same to the spoke of a vehicle wheel the plate is longitudinally bent upon itself to conform to such spoke, and is secured thereto by bending the ears or lugs 9 and 10 as shown in Figure 2 and passing a bolt 13 through the perforations in said lugs.

Having thus described my invention, I claim:

As a new article of manufacture a match scratcher, comprising a pliable metallic sheet having a body portion substantially of rectangular shape arranged with perforated lugs extending oppositely from the sides at the ends of the body portion, a series of rows of corrugations extending longitudinally of the body portion, beads at opposite ends and intermediate the rows of and to extend above the corrugations to serve as guides, and fastening means to engage the lug perforations of a pair of opposite lugs to attach the scratcher to an object, for the purpose specified.

Signed at Fort William, in the Province of Ontario and Dominion of Canada, October, 1919.

PETER McCUAIG.